Figure 1:
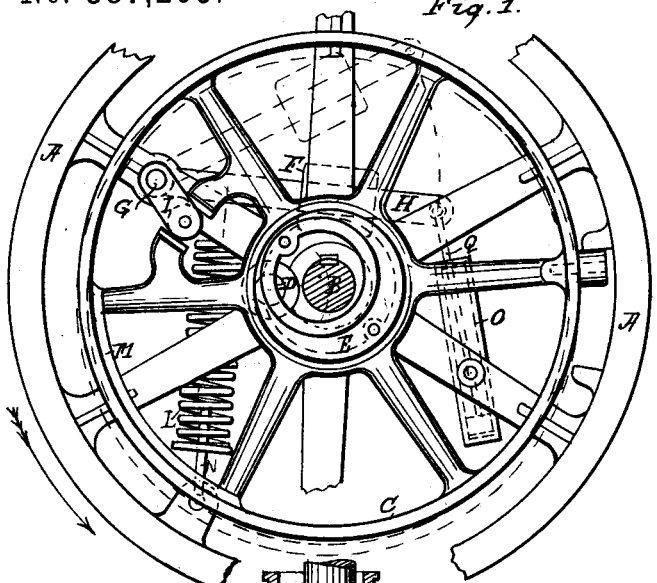

(No Model.) 2 Sheets—Sheet 1.

J. BEGTRUP.
STEAM ENGINE GOVERNOR.

No. 387,205. Patented Aug. 7, 1888.

WITNESSES:

INVENTOR.
Julius Begtrup (No Model.) 2 Sheets—Sheet 2.

J. BEGTRUP.
STEAM ENGINE GOVERNOR.

No. 387,205. Patented Aug. 7, 1888.

WITNESSES. INVENTOR.
Julius Begtrup.

UNITED STATES PATENT OFFICE.

JULIUS BEGTRUP, OF JERSEY CITY, NEW JERSEY.

STEAM-ENGINE GOVERNOR.

SPECIFICATION forming part of Letters Patent No. 387,205, dated August 7, 1888.

Application filed December 20, 1887. Serial No. 258,534. (No model.)

*To all whom it may concern:*

Be it known that I, JULIUS BEGTRUP, a subject of the King of Denmark, residing in Jersey City, Hudson county, New Jersey, have invented certain new and useful Improvements in Steam-Engine Governors, of which the following is a description in such full, clear, concise, and exact terms as will enable others skilled in the art to which my invention appertains to make and use the same, reference being had to the accompanying drawings, making part of this specification, and to the letters and figures of reference marked thereon.

Similar letters of reference indicate corresponding parts in all the figures.

My invention relates to that class of steam-engine governors which regulate the steam-supply and speed of the engine by changing the position of an eccentric, thereby causing a longer or shorter period of opening of the valve to admit steam to the cylinder at each stroke of the piston, in accordance with the varying amount of power required or varying steam-pressure.

Governors of this general class, actuated solely by a centrifugal-acting weight or weights carried around with the shaft and by springs which tend to draw said weights inward, have long been known. There is another class of governors, known as "momentum" or "fly wheel" governors, in which the momentum or inertia of wheels or weights rotating with the shaft is utilized, in combination with the ordinary centrifugal weights, for the purpose of rendering the governor more certain, prompt, and efficient in its action. A patent on a governor attachment of this class was granted me, No. 326,092, and dated September 15, 1885, and my present invention is an improvement in this general class of governors. Among other things, it may be observed that in all governors of said class as heretofore constructed the eccentric and momentum or inertia wheel or mass are separate parts, each one having its own pivot of oscillation or journal, and one connected with the other by links, springs, rollers, &c.

My present invention consists, among other things, in forming the eccentric integral with the inertia-wheel, either cast on it or securely fastened to it by bolts, screws, or rivets, or the inertia-wheel and eccentric both rigidly secured to a common pivot-shaft journaled in the disk or pulley upon which the governor is mounted, so that the said common pivot-shaft forms a rigid connection between eccentric and inertia-wheel. By this construction I obtain a governor composed of fewer parts, with fewer joints and journals, and with less friction and greater durability than other governors of the same class; and, further, in journaling the inertia weight, wheel, or mass upon a shaft independent and not coincident with the shaft on which the fly-wheel revolves.

My present invention embraces, also, an improved manner of connecting the centrifugal weight with the inertia-wheel, besides other combinations which improve the action and increase the efficiency of the governor.

These and other points of novelty will be designated in the claims concluding this specification.

The following is a description of the accompanying drawings, and of my invention as applied thereto.

Figure 2:
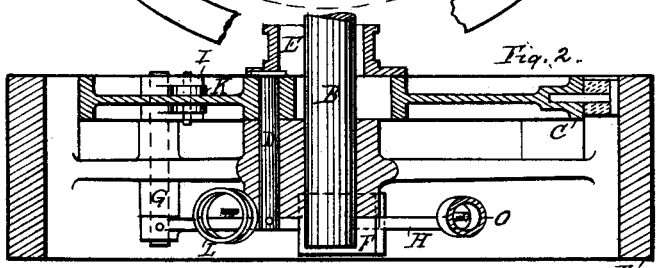
Figure 8:
Figure 3:
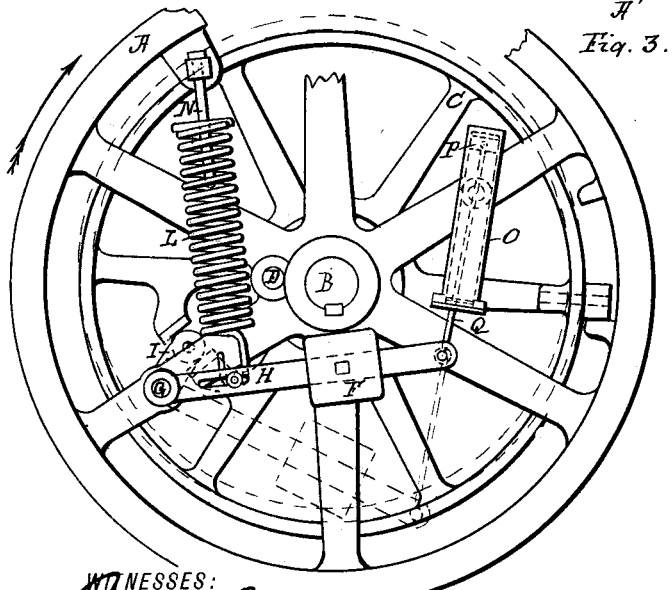

Figures 1 and 3 are front and rear elevations showing my improved governor mounted on the fly-wheel or driving-pulley of the steam-engine, and Fig. 2 is a central section of the same. Figs. 4, 5, 6, 7, 8, 9, 10, 11, 12, 13, 14, 15, and 16 illustrate detail parts of said structure and modifications thereof.

A is the fly-wheel or driving-pulley, which is keyed or bolted to the crank-shaft B.

C is an inertia mass, which I preferably give the shape of a wheel, as shown here. It is pivoted to the fly-wheel or governor casing at D.

E is an eccentric cast on the inertia-wheel or bolted to it, and to which an ordinary strap (not shown) is attached. The inertia-wheel and eccentric have openings in their center for the shaft to pass through and to allow sufficient movement of the eccentric across the shaft. It will be seen that when the inertia-wheel turns on its pivot D it carries the eccentric across the shaft in a curved path. By this movement the eccentricity or throw of the eccentric is changed, whereby more or less steam is admitted to the cylinder in accordance with the amount of steam-power required.

Figures 4, 5:
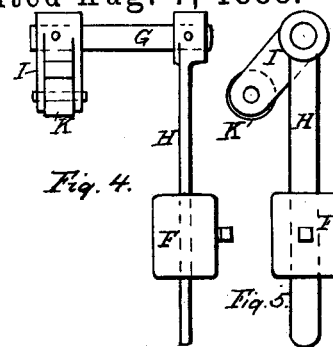

The centrifugal action of the compound governor is furnished by a single weight, F, mounted on the opposite side of the governor pulley or disk, as shown in Figs. 1, 2, and 3. The arrangement of centrifugal weight here shown forms another essential part of my invention. Figs. 4 and 5 are two views of this part of my invention as it appears detached from the governor.

The centrifugal weight F is attached to or cast solid with an arm, H, which is pivoted to the fly-wheel or governor casing at G. The arm H is fixed to the pivot shaft G, which has a shorter arm, I, fixed to its opposite end on the other side of the fly-wheel. This arm carries a roller or sliding block, K, adapted to move between two parallel surfaces on the inertia-wheel, so that oscillating movements of the arm H will cause corresponding oscillating movements of the inertia-wheel. The two arms H and I form, in connection with the shaft G, a sort of two-armed lever, which in machine design is termed a "rocker-arm." The spring L is pivoted to the arm H, and tends to draw the weight F toward the crank-shaft in opposition to the centrifugal force, which tends to move it out from the shaft.

In the specification of Patent No. 326,092, dated September 15, 1885, I have shown and described a similar manner of connecting the centrifugal weight with the inertia-wheel in a governor with an eccentric which rotates on the crank-shaft without changing its eccentricity and with the inertia-wheel or wheels journaled on the crank-shaft. In my present invention I have to great advantage devised a means of applying the same manner of connecting the centrifugal weight with the inertia-wheel in a governor with an eccentric which moves in a direction transversely to the shaft and with the inertia-wheel pivoted to a point outside the center of rotation of the governor, for as the inertia-wheel in this governor is not supported at its center it has a downward tendency, due to gravity, and this downward tendency is opposed by the centrifugal weight F, which is so arranged that its weight will draw the inertia-wheel in an opposite direction. The weight and centrifugal action of the respective parts may therefore be brought to partially or fully counterbalance each other, which is desirable to secure smooth running. Part of the weight of the inertia-wheel may be counterbalanced by a weight fixed to or cast on the inertia-wheel, as shown at M.

I gain another advantage by the above-described arrangement of centrifugal weight and inertia-wheel, for as there is nothing but a single lever and spring on one side of the fly-wheel or governor casing I am able to apply a large and powerful spiral spring to oppose the centrifugal tendency of the weight F, and this spring can easily be adjusted for more or less tension by a screw, N, and by changing its distance from the pivot G, and in this manner the governor adjusted for any speed the engine may be required to run and for any degree of isochronism. Besides, this arrangement of centrifugal weight makes the appliance of other improvements, hereinafter described, more convenient.

Figure 10:
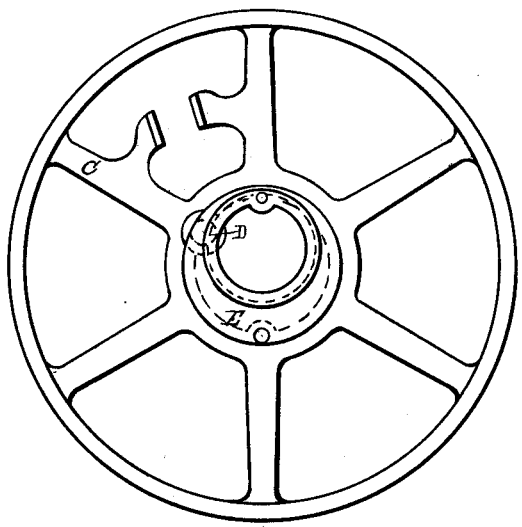
Figure 11:
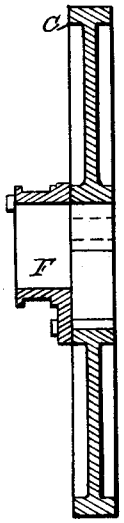
Figure 12:
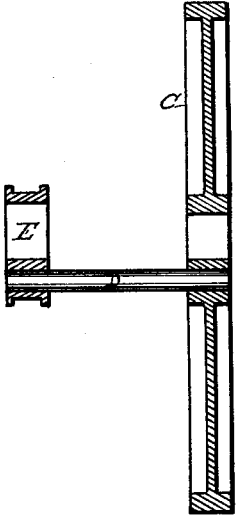

Instead of having the eccentric and inertia-wheel both on the same side of the pulley or fly-wheel A, I can have the inertia-wheel on one side and the eccentric on the other side, both securely fastened to the pivot-shaft D, which is their common pivot of oscillation, and in this case forms a rigid connection between the said two parts. Fig. 12 is a sectional view of the eccentric and inertia-wheel thus connected, and Figs. 10 and 11 show the inertia-wheel having the eccentric directly attached to it by bolts or otherwise.

Figure 14:
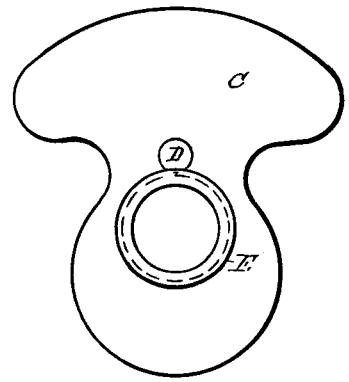

Instead of a wheel, I can use an inertia mass of various shape—for example, a two-armed weighted lever pivoted to the governor-casing at D, with the eccentric and an additional weight on one side of the pivot and a corresponding weight on the other side, as shown detached in Fig. 14.

Figures 6, 7:
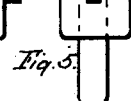

Instead of the roller K, which is journaled on the arm I and moves between two parallel surfaces on the inertia wheel or mass, I can use a sliding block with flat sides, or I can give the arm I a rounded or tapering shape, as shown in Figs. 6 and 7, and let it engage directly with the inertia-wheel, which then has an aperture of corresponding shape to receive it; or I can connect the arm I with the inertia-wheel by a short intermediate link pivoted to both.

When a slight change in rotative speed occurs, the centrifugal weight will either move out from the crank-shaft on account of increased centrifugal force or the spring will draw it inward on account of a diminution in centrifugal force, and the inertia wheel or mass will at the same time operate by its inertia or momentum to move the eccentric in the same direction as that in which the centrifugal weight will move it. Besides, the inertia-wheel will effectively check vibratory movements induced by the action of reciprocating forces on the eccentric or by a change of load on the engines—that is to say, the inertia-wheel will counteract the condition technically termed "hunting." The inertia-wheel, however, will, under certain conditions, be found insufficient for this purpose, and I have therefore devised a peculiar combination which renders the inertia-wheel more efficient and positively obviates hunting, even under the most unfavorable conditions, which part of my invention I will now describe.

In applying an automatic cut-off governor to a steam-engine with a comparatively small fly-wheel it will be found desirable to make the governor very sensitive, so as to respond quickly to any variation in load, for if this be not done the fluctuation in speed will be very great by any sudden increase or reduction of the resistance or work which the engine has to overcome; but by applying a very sensitive governor to this class of engines another difficulty is met with, to wit: As the movements of the governor-weights must be very quick, they will thereby acquire a great momentum, which is liable to carry them too far in either direction and cause incessant and abnormal variations in speed of the engine, which is the condition technically called "hunting." To remedy this defect, it has therefore been found necessary to so adjust the governor that the engine would run at a considerably slower speed when heavily loaded than it would when running light, and this more particularly so with engines having a small fly-wheel. Such engines would therefore not work satisfactorily where a uniform speed was required under all conditions of load and steam-pressure.

By a governor operated by an inertia-wheel it is always possible to obtain a steady uniform speed by applying a sufficiently large fly-wheel to the engine; but as a large fly-wheel is often very inconvenient in connection with the smaller class of engines, which cannot be put on an independent foundation, and particularly so with vertical engines, I have devised other means by which a perfect regulation of speed can be obtained by this class of engines, and for which the governor here described is especially adapted. It consists of a cylinder, O, Figs. 1, 2, and 3, attached to the fly-wheel or governor casing, and a piston, P, fitted to said cylinder and connected with the arm H by a rod, Q, in such a manner that oscillating movements of the arm H will cause the piston to move in the cylinder, and the resistance of the air confined in the cylinder will therefore in a very effective manner check the movements of the inertia-wheel. As the resistance of the air in the cylinder increases in a greater ratio than the velocity with which the piston moves and is hardly appreciable by a slow movement, it will not in the first instance prevent the governor from responding promptly to any variation in speed; but it will thereafter neutralize and reverse the action of the inertia-wheel—that is to say, the inertia-wheel, which in the first place operates to accelerate the movements of the governor mechanism on account of its inertia or resistance to change in rotative speed, will in the next instance, on account of the increased resistance in the air-cylinder, attain a rotative speed corresponding to the speed of the fly-wheel, and in this condition operate by its inertia to arrest the movements of the governor-weights. The operation of the inertia-wheel in combination with the air-cylinder will therefore not only be to promptly move the governor mechanism, but also to promptly stop its movements by counteracting the effect of inertia of the centrifugal weight or weights, which, as before explained, would cause them to move too far.

I do not claim, broadly, the cylinder and piston here described, combined with a governor, as my invention, as similar contrivances, called "dash-pots," have been used in different ways in connection with governors actuated by centrifugal weights without any inertia wheel or mass. The action of the dash-pot in such governors, however, is quite different from and much less effective than when used in connection with an inertia-wheel as here described. The operation of the dash-pot in a governor without an inertia-wheel is simply to reduce, and to some extent equalize, the centrifugal action of the weights. The function of the dash-pot in such governors is only a passive one. It simply prevents the weights from moving too fast, but does not prevent them from moving too far.

It is not possible with such governors to run the engine at a perfectly uniform speed under all conditions of load and steam-pressure, for to keep the movements of the weight or weights within certain limits it will be necessary to so adjust the tension of the centripetal-acting spring that the resistance of the spring when the weight moves out from the shaft increases in a greater ratio than the centrifugal force of the weight, and this is the only means by which hunting can be prevented with such governors. The speed of engines with such governors must therefore necessarily vary in accordance with different conditions of load and steam-pressure, whether a dash-pot be used or not, and this defect is particularly marked when a comparatively small fly-wheel is used. The smaller the wheel the greater must be the difference in speed of the engine.

Figure 13:
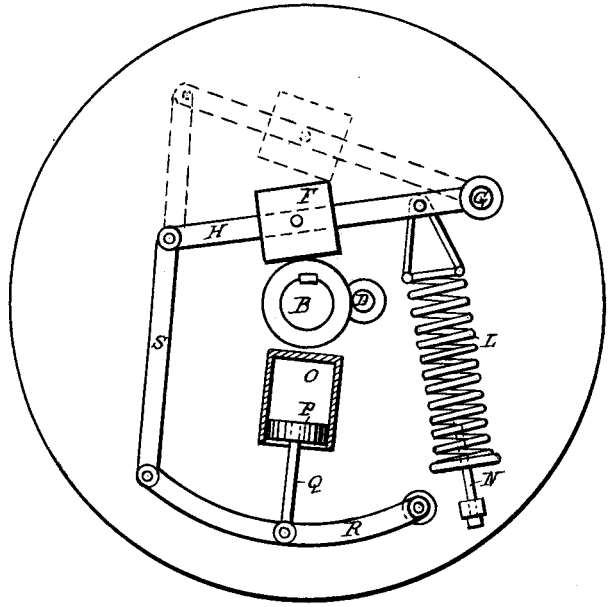

In using a dash-pot in combination with an inertia wheel or mass it is not only possible to run the engine on exactly the same speed under all conditions of load and steam-pressure, but the governor may even be so adjusted that the speed increases when the load is increased, and this I have by actual experiments shown to be possible, even with a small engine having a comparatively small fly-wheel and with the governor operating an ordinary slide-valve. I have in Fig. 13 shown another way of connecting the dash-pot with the governor system. The piston-rod is here pivoted to the lever R, which is connected with the lever H by a link, S. By this arrangement I obtain a shorter cylinder in a radical position relatively to the center of rotation of the governor. The centrifugal action, being here in line with the cylinder, will allow the piston to move freely without friction on the walls of the cylinder.

I do not confine myself to the here-described arrangement of the dash-pot. It is not of much consequence how the cylinder is connected with the governor system, the main object being to make the movement of the piston dependent on the movements of the inertia-wheel, and the mutual action and reaction between their two parts will then bring about the desired result, as before described, whether the dash-pot is connected to the inertia-wheel directly or through any system of levers.

The cylinder of the dash-pot may be filled with oil or any other liquid and closed with an ordinary stuffing-box. I prefer to utilize the resistance of air only, and leave one end of the cylinder open and a small hole in the other end, through which the air can escape. The resistance of the air will then act by suction when the piston moves one way and by compression when it moves the other way. I have designed other simple means by which the air may be shut off at both ends of the cylinder, and thereby a more equal resistance obtained, which I now shall describe.

Figure 9:
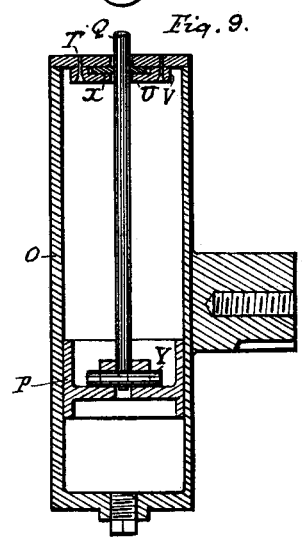

Fig. 9 shows the air-cylinder detached from the governor. T is a flat disk screwed to the end of the cylinder. This disk has a slot through its center, through which the piston-rod passes, and can move laterally in correspondence with the oscillating movements of the lever to which it is attached. A plate, U, with distance-pieces V, is attached to the inside of the cover-plate. Confined between these two plates is a loose sliding plate, with a hole in the center, which fits snugly on the piston-rod. This plate covers the slot in the cover-plate and makes a tight joint for the piston-rod. The piston-rod is attached to the piston by a pin, Y, so as to allow the rod to move sidewise independent of the piston; or the rod may be rigidly attached to the piston, which then may have spherical sides, so as to allow a slight oscillating movement of the piston. The above-described construction allows of the cylinder being fixed to the governor-casing, so that it cannot move in any direction, and will therefore not be affected by centrifugal action, which otherwise would tend to increase the friction. It is not necessary to have the plates U and V on the inside of the cover-plate. They could be mounted outside as well, but would then have to be more carefully fitted.

Figure 15:
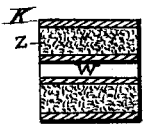
Figure 16:
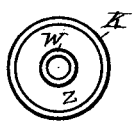

I have also devised means by which the joints connecting the levers and other parts of the governor mechanism can be made flexible without materially increasing the cost, and which, moreover, imparts some elasticity to the governor system, making it less liable to break, and protects it from injury by violent movements of the weights and inertia-wheel. It consists in a leather or rubber packing inserted in one of the connecting parts, a metal bush inserted in the center of said packing, in which is journaled a pin or stud attached to the other connecting parts. I have in Figs. 15 and 16 shown this improvement as applied to the roller K, which connects the centrifugal weight with the inertia-wheel.

Z is the rubber or leather core, and W is the metal bush.

What I claim, and desire to secure by Letters Patent, is—

1. In an engine-governor, an inertia-weight combined with an eccentric rigidly connected therewith, substantially as described.

2. In an engine-governor, an inertia-weight combined with an eccentric, said weight and eccentric both moving about a common center of oscillation not coincident with the axis of the driving-shaft, substantially as described.

3. In an engine governor, an inertia-weight, an eccentric, and a fly-wheel, said inertia-weight and fly-wheel revolving about centers not coincident, substantially as described.

4. In an engine-governor, a weight pivoted to a revolving part of the engine and controlling an arm combined with an inertia-weight, to which said arm is connected, said inertia-weight revolving about an axis not coincident with axis of the driving-shaft, substantially as described.

5. In an engine-governor, a weight, a fly-wheel to which it is pivoted, and an arm controlled by said weight, combined with an inertia-weight, to which said arm is connected, said fly-wheel and inertia-weight revolving about axes not coincident, substantially as described.

6. In an engine governor, an inertia-weight supported at and free to revolve about a point outside of its center of gravity, combined with an eccentric, substantially as described.

7. In an engine-governor, the combination of an inertia-weight and a dash-pot connected thereto, substantially as described.

8. In an engine-governor, the combination of an inertia-weight, a centrifugal weight, and a dash-pot, substantially as described.

9. In an engine-governor, a dash-pot having a slotted cover to permit lateral motion of the piston-rod, and a plate fitted on the piston-rod adapted to slide on said slotted cover, substantially as described.

10. In an engine-governor, a flexible or elastic bearing consisting of metal bushing combined with an elastic packing, substantially as described.

11. In an engine-governor, the combination of an inertia-weight revolving about an axis not coincident with the axis of the driving-shaft, a centrifugal weight, and a rocker-arm to which the centrifugal weight is immediately attached, substantially as described.

12. In an engine-governor, the combination of an inertia-weight supported at a point outside of its center of gravity, and a centrifugal weight arranged to counterbalance each other under the influence of gravity, substantially as described.

JULIUS BEGTRUP.

Witnesses:
J. EDGAR BULL,
ROBERT BARTLETT.